(12) United States Patent
Shigeoka et al.

(10) Patent No.: US 8,047,722 B2
(45) Date of Patent: Nov. 1, 2011

(54) WHEEL BEARING APPARATUS FOR A VEHICLE

(75) Inventors: Kazuhisa Shigeoka, Iwata (JP); Kazunari Yamamoto, Iwata (JP); Akira Torii, Iwata (JP)

(73) Assignee: NTN Corporation (JP)

( * ) Notice: Subject to any disclaimer, the term of this patent is extended or adjusted under 35 U.S.C. 154(b) by 248 days.

(21) Appl. No.: 12/436,205

(22) Filed: May 6, 2009

(65) Prior Publication Data

US 2009/0274405 A1 Nov. 5, 2009

Related U.S. Application Data

(63) Continuation of application No. PCT/JP2007/001215, filed on Nov. 6, 2007.

(30) Foreign Application Priority Data

| Nov. 7, 2006 | (JP) | 2006-301321 |
| Nov. 21, 2006 | (JP) | 2006-314678 |
| Nov. 21, 2006 | (JP) | 2006-314679 |
| Dec. 27, 2006 | (JP) | 2006-351742 |
| Mar. 26, 2007 | (JP) | 2007-078176 |

(51) Int. Cl.
*F16C 19/08* (2006.01)
(52) U.S. Cl. ........................................... 384/544
(58) Field of Classification Search .......... 384/544, 384/589, 512, 513
See application file for complete search history.

(56) References Cited

U.S. PATENT DOCUMENTS

| 5,177,869 A | 1/1993 | Andersson |
| 2006/0171624 A1 | 8/2006 | Niebling et al. |
| 2010/0021099 A1 * | 1/2010 | Torii ........................... 384/544 |
| 2010/0239202 A1 * | 9/2010 | Kuroda et al. ................ 384/512 |
| 2010/0316323 A1 * | 12/2010 | Shibata et al. ............... 384/589 |

FOREIGN PATENT DOCUMENTS

| DE | 689 06 917 | 1/1994 |
| DE | 103 31 180 | 2/2005 |

(Continued)

*Primary Examiner* — Thomas R Hannon
(74) *Attorney, Agent, or Firm* — Harness, Dickey & Pierce, P.L.C.

(57) ABSTRACT

A vehicle wheel bearing apparatus has a substantially cylindrical outer ring formed with double row outer raceway surfaces on its inner circumference and with press fitting surfaces on its outer circumferences of its cylindrical portions. A pair of inner rings is formed with inner raceway surfaces on their outer circumferences. The inner rings cylindrical portions have fitting surfaces on their inner circumferences. The fitting surfaces fit onto a cylindrical portion of a wheel hub. The inner rings are adapted to be arranged so that end faces of the cylindrical portions abut each other. Double row rolling elements are freely rollably arranged between outer and inner raceway surfaces. At least the outer ring of the outer and inner is formed by pressing or rolling from a plate member or a pipe member. The outer ring and the inner rings have cylindrical portions axially extending, respectively, from the outer raceway surfaces and the inner raceway surfaces. The thickness of the cylindrical portions of the outer ring is thinner than that of the outer raceway surfaces. Seals are arranged in annular spaces formed between the inner circumferences of the cylindrical portions of the outer ring and the outer circumferences of the cylindrical portions of the inner rings. The seals are adapted to be press-fit into the inner circumferences of the cylindrical portions of the outer ring. The double row outer raceway surfaces of the outer ring and the inner raceway surfaces of the inner ring are surface hardened.

19 Claims, 11 Drawing Sheets

FOREIGN PATENT DOCUMENTS

| | | |
|---|---|---|
| EP | 0 328 496 | 1/1996 |
| EP | 1 672 230 | 6/2006 |
| JP | 62-63419 | 4/1987 |
| JP | 62-194921 | 12/1987 |
| JP | 01-210612 | 8/1989 |
| JP | 04-1721 | 1/1992 |
| JP | 06-1835 | 1/1994 |
| JP | 6-47732 | 6/1994 |
| JP | 06-073459 | 10/1994 |
| JP | 07-077217 | 3/1995 |
| JP | 07-88848 | 9/1995 |
| JP | 08-011505 | 1/1996 |
| JP | 2563692 | 11/1997 |
| JP | 2002-039199 | 2/2002 |
| JP | 2003-025803 | 1/2003 |
| JP | 2003-090350 | 3/2003 |
| JP | 2003-159904 | 6/2003 |
| JP | 2004-197755 | 7/2004 |
| JP | 2004-245260 | 9/2004 |
| JP | 2005-075067 | 3/2005 |
| JP | 2005-180681 | 7/2005 |
| JP | 2005-289255 | 10/2005 |
| JP | 2006-029543 | 2/2006 |
| JP | 2006-177519 | 7/2006 |
| WO | WO 98/55248 | 12/1998 |
| WO | WO 01/54925 | 8/2001 |
| WO | WO 2005/008085 | 1/2005 |
| WO | WO2005/052396 | 6/2005 |
| WO | WO 2005/059388 | 6/2005 |
| WO | WO 2005/059389 | 6/2005 |

\* cited by examiner

[Fig 1]
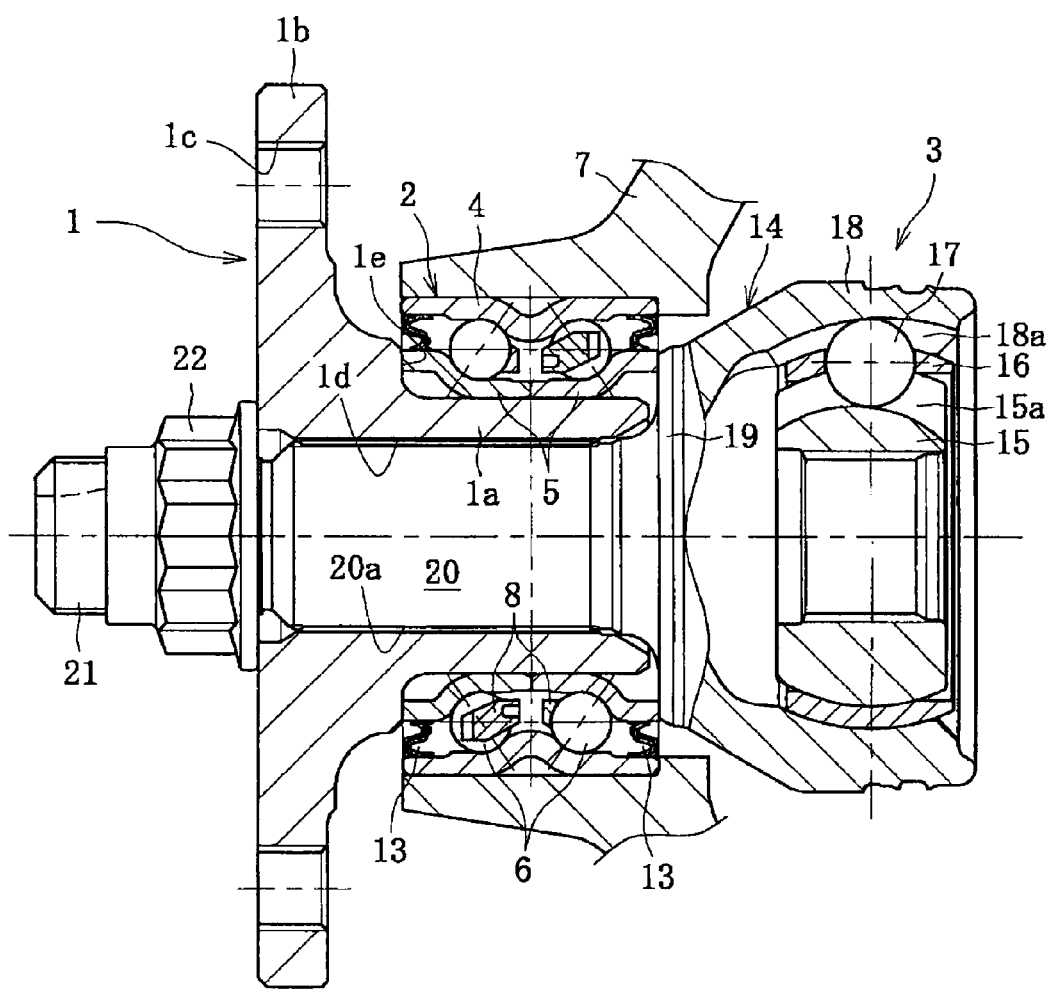

[Fig 2]
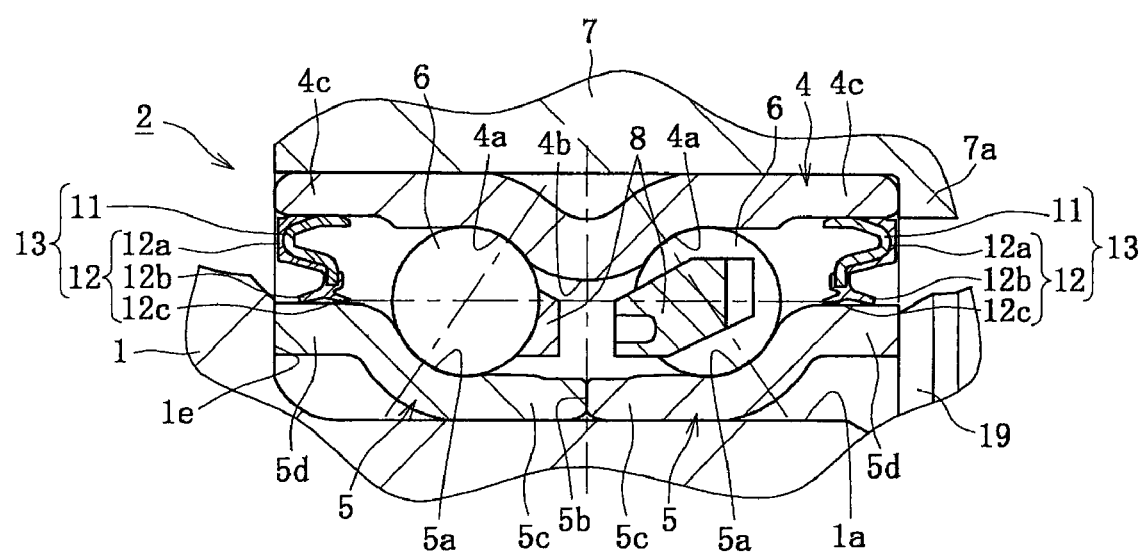

[ Fig 3 ]
(a)
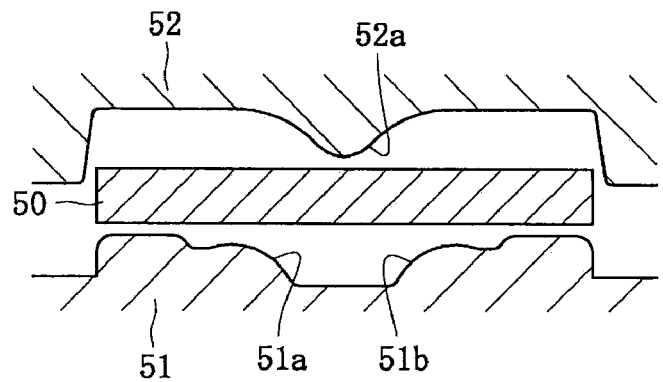
(b)
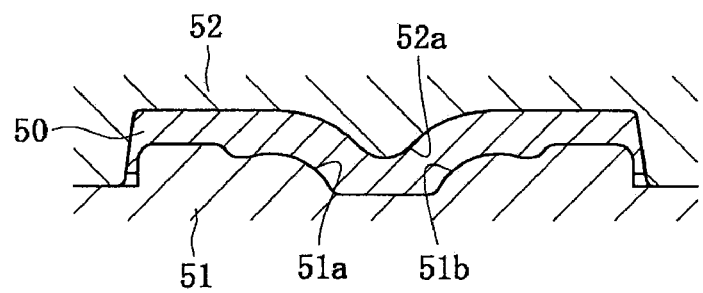
[ Fig 4 ]
(a)
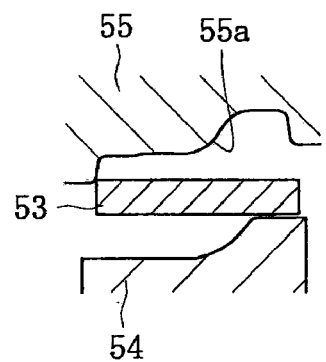
(b)
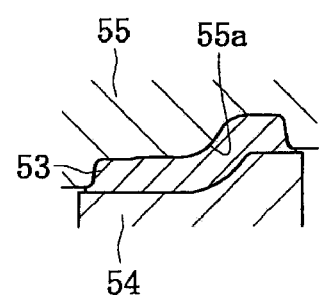

[ Fig 5 ]
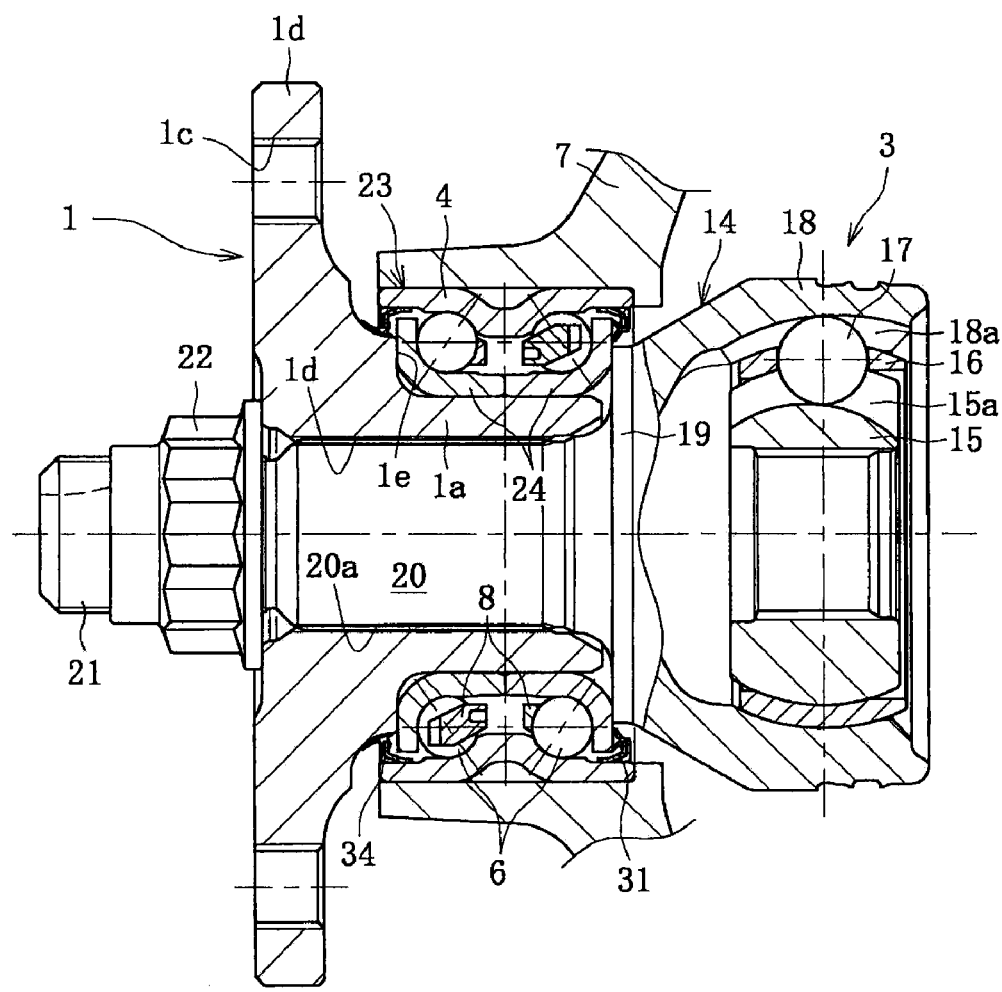

[ Fig 6 ]
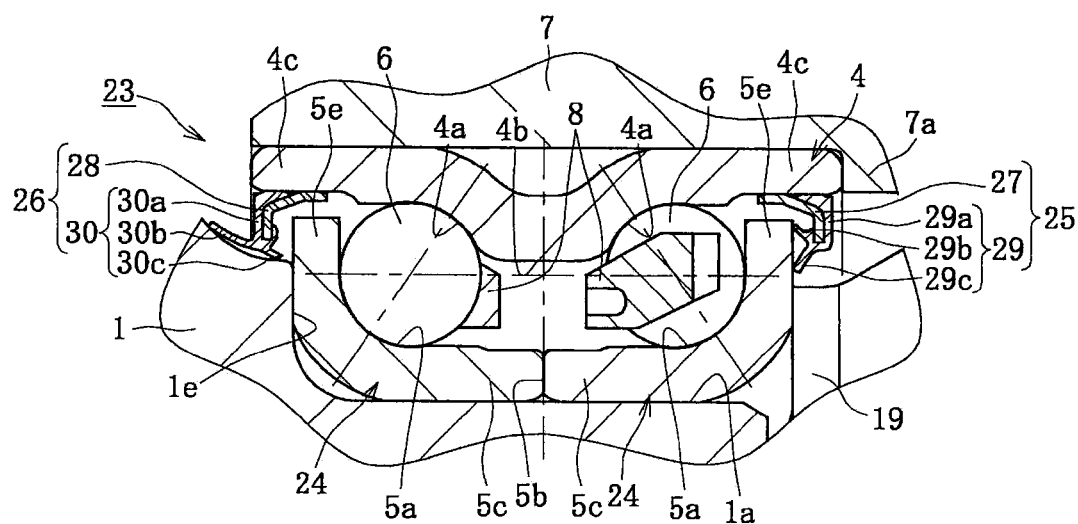
[ Fig 7 ]
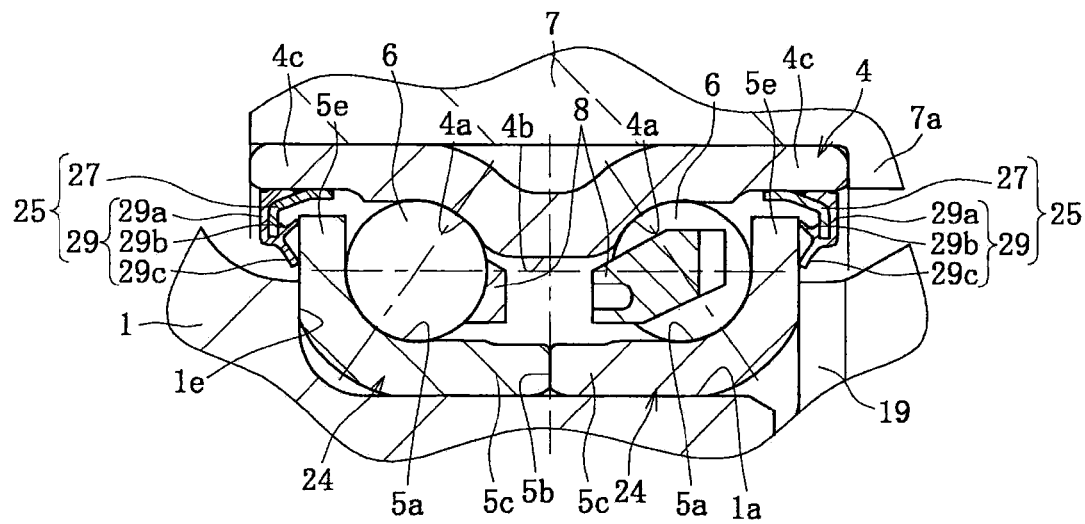

[ Fig 8 ]
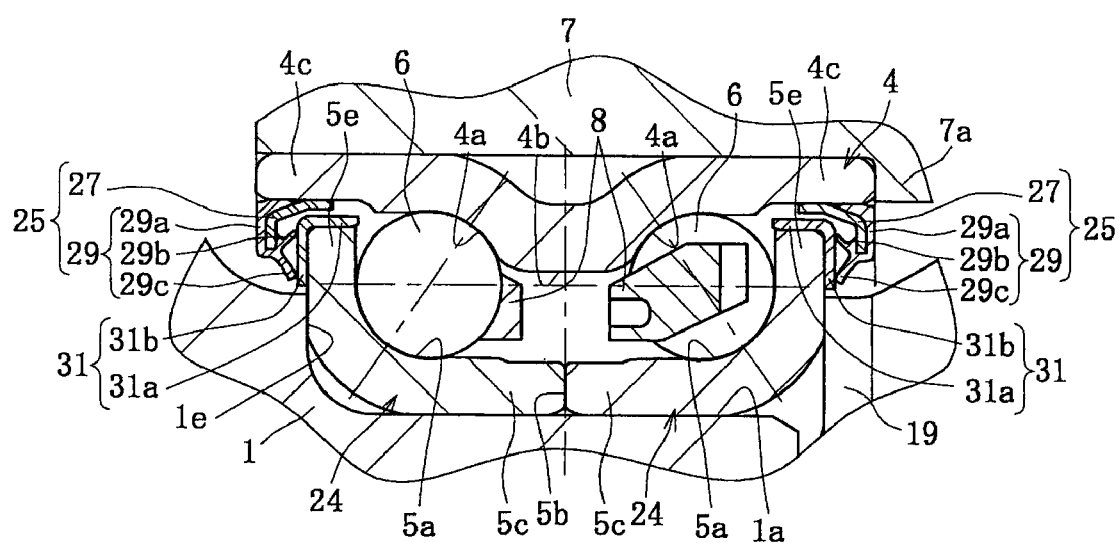

[Fig 9]
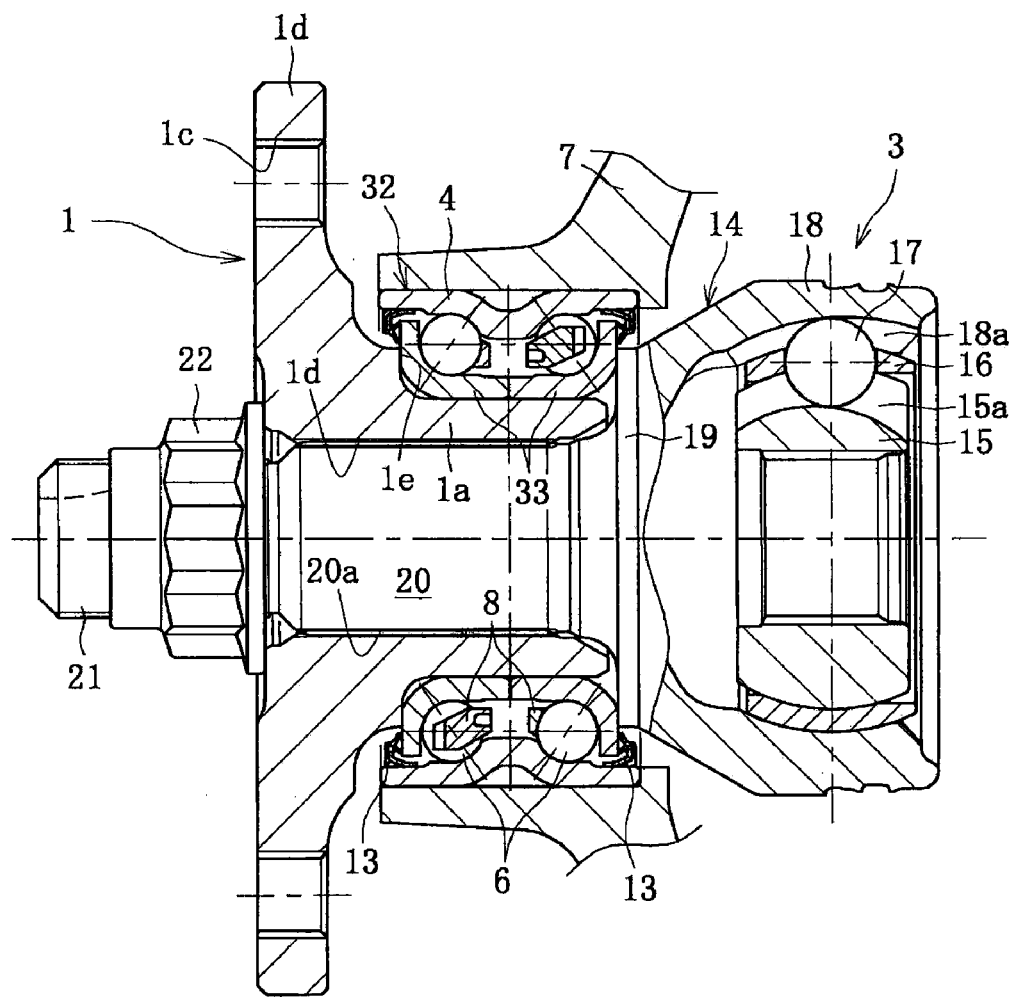

[ Fig 10 ]
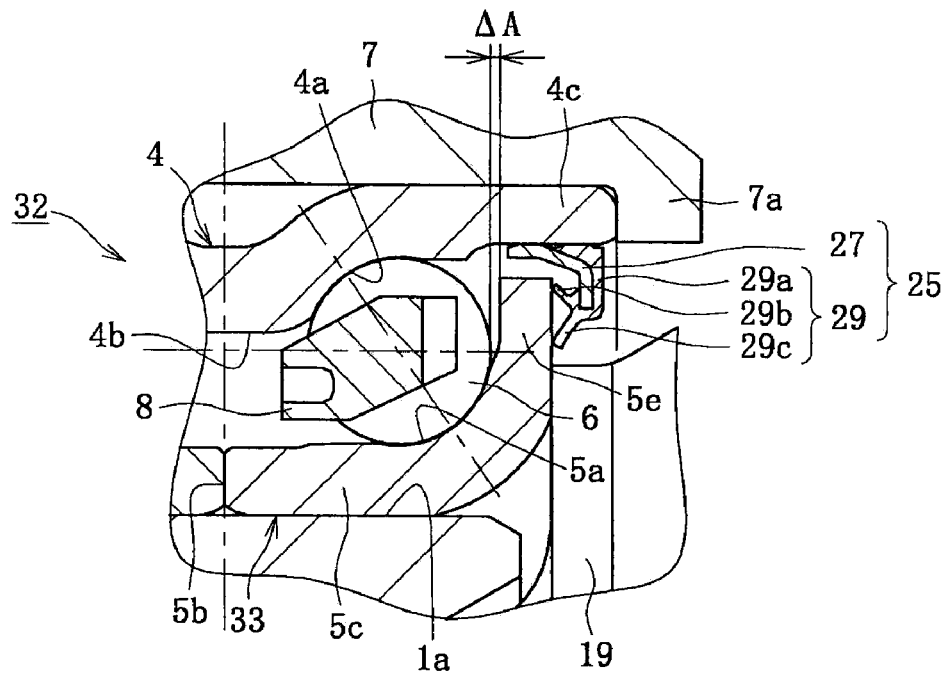
[ Fig 11 ]
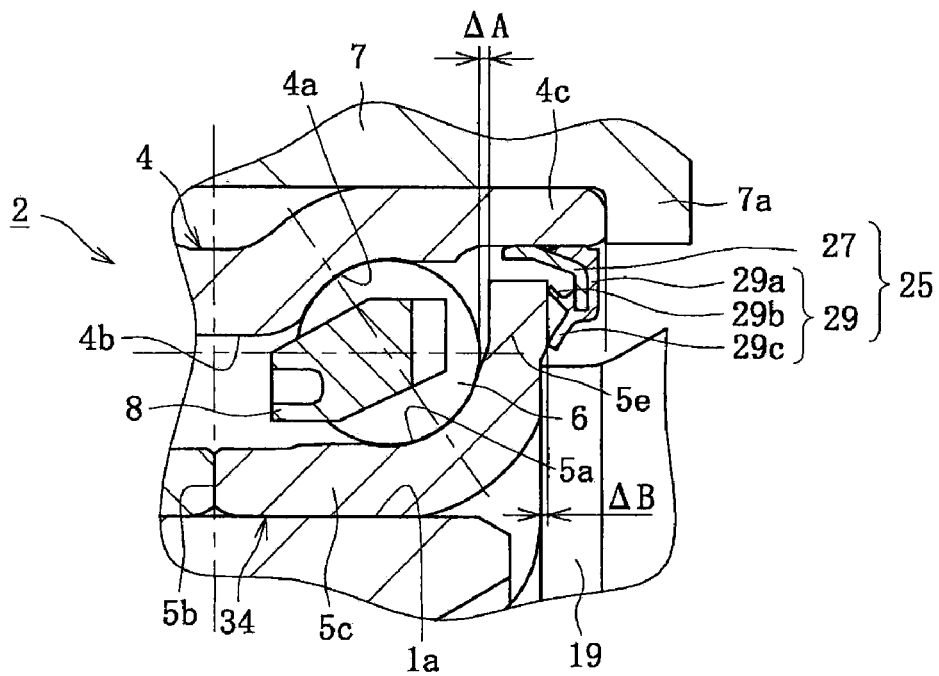

[Fig 12]
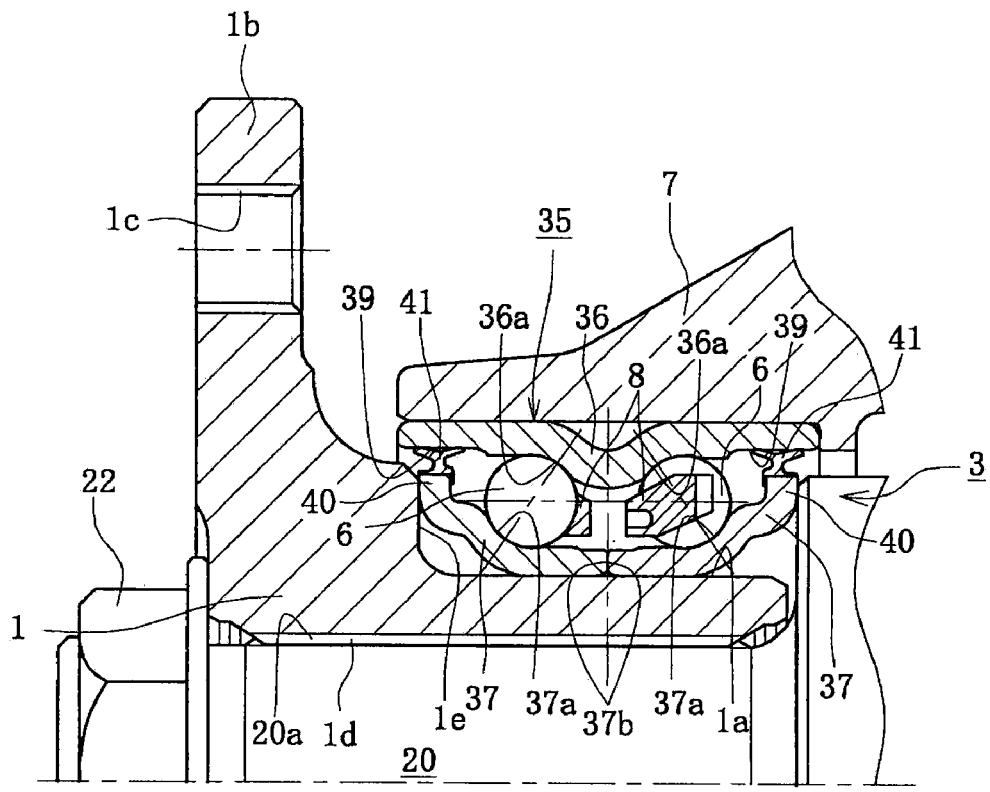
[Fig 13]
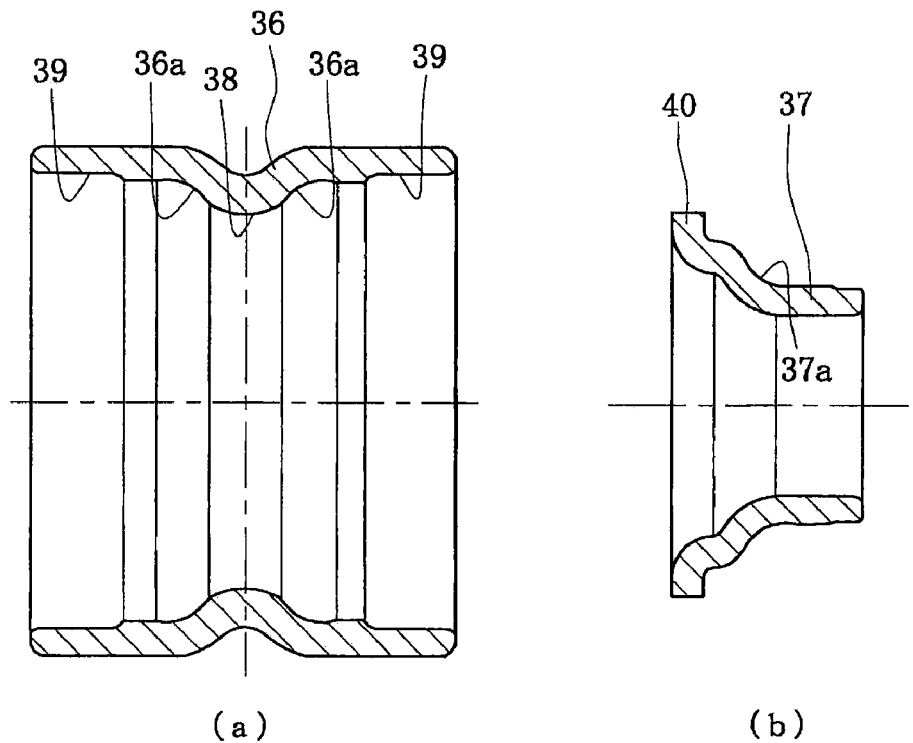
(a)           (b)

[Fig 14]
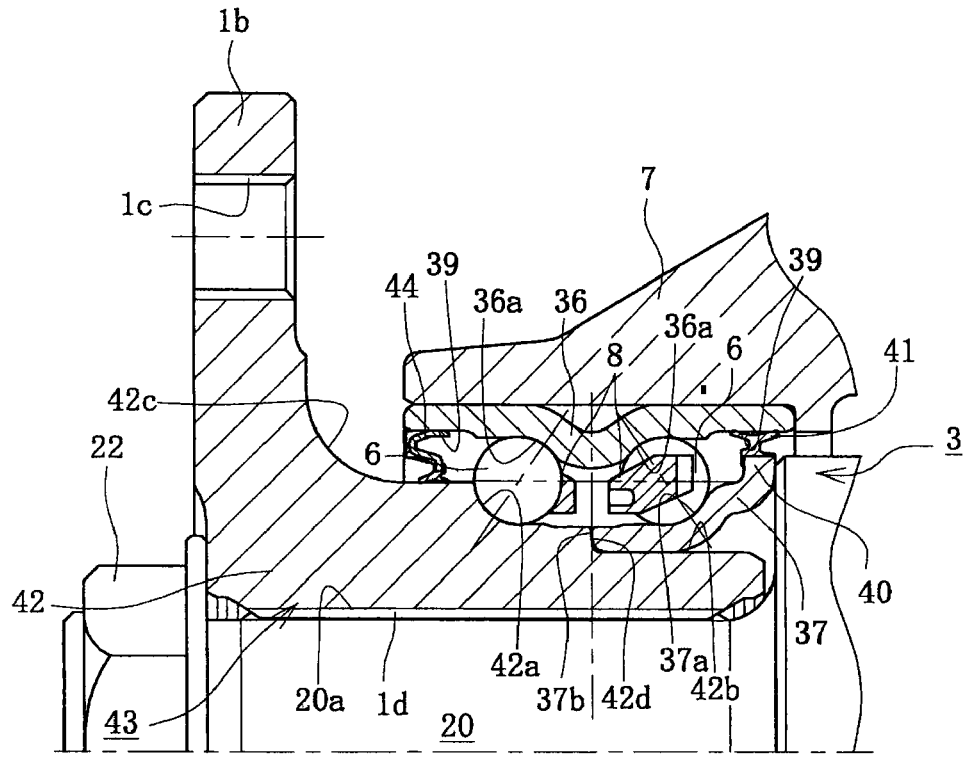
[Fig 15]
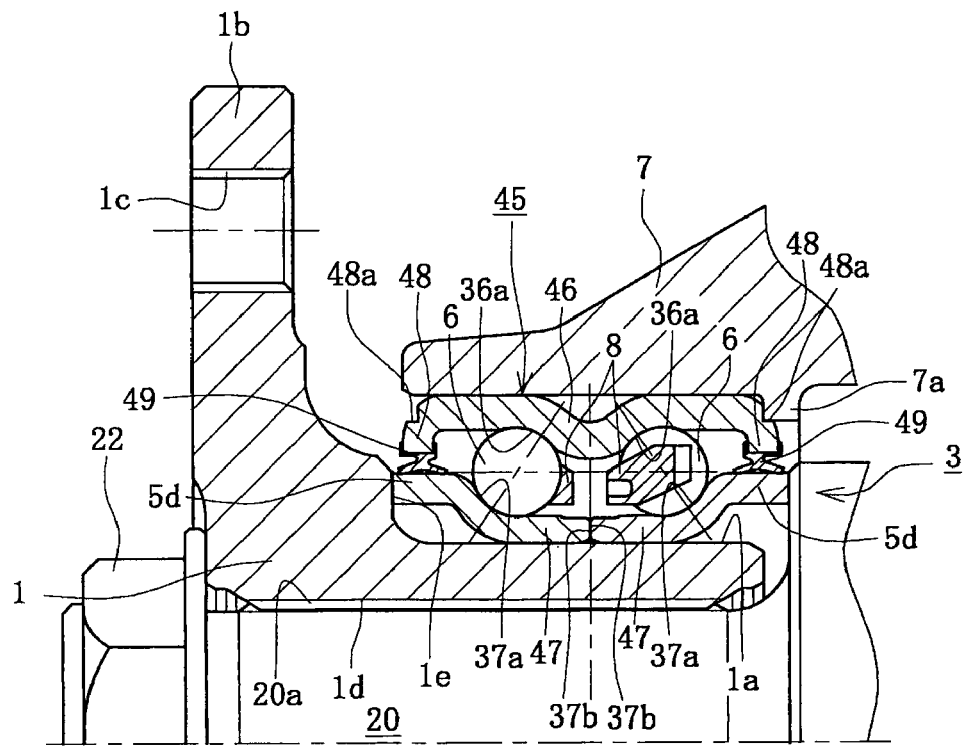

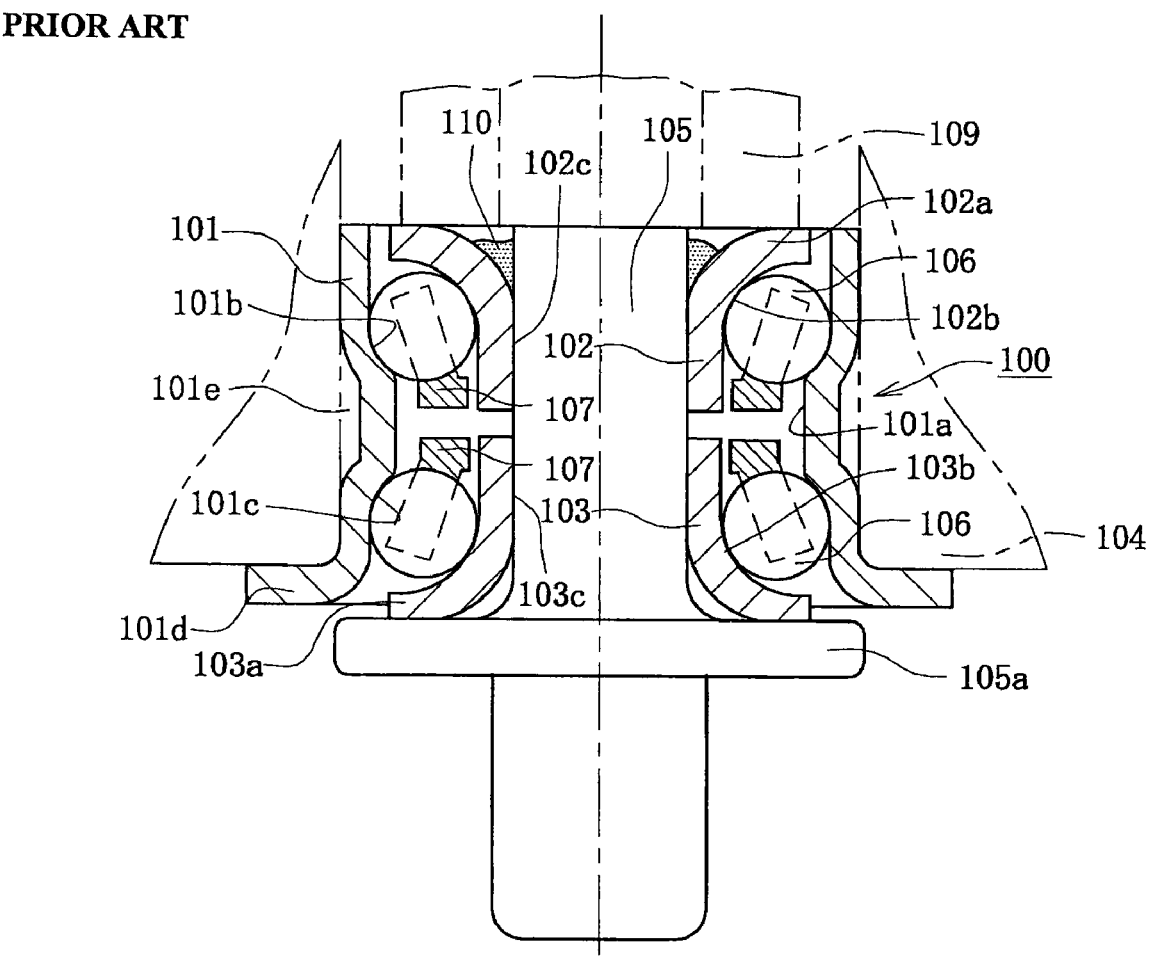
[Fig 16]
PRIOR ART

WHEEL BEARING APPARATUS FOR A VEHICLE

CROSS-REFERENCE TO RELATED APPLICATIONS

This application is a continuation of International Application No. PCT/JP2007/001215, filed Nov. 6, 2007, which claims priority to Japanese Application Nos. 2006-301321, filed Nov. 7, 2006; 2006-314679, filed Nov. 21, 2006; 2006-314678, filed Nov. 21, 2006; 2006-351742, filed Dec. 27, 2006; and 2007-078176, filed Mar. 26, 2007. The disclosures of the above applications are incorporated herein by reference.

FIELD

The present disclosure relates to a vehicle wheel bearing apparatus that freely rotationally supports a wheel of a vehicle such as an automobile and, more particularly, to a wheel bearing apparatus intended to reduce its weight, size as well as manufacturing cost.

BACKGROUND

Wheel bearing apparatus supports a vehicle wheel and freely rotationally supports a wheel hub for mounting a wheel via a double row rolling bearing is used for a driving wheel and a driven wheel. For structural reasons, the inner ring rotation type is used for the driving wheel and both the inner ring rotation type and the outer member rotation type are used for the driven wheel. There are four generation types of wheel bearing apparatus. The first generation type has a wheel bearing including a double row angular contact ball bearing, etc., fit between a knuckle, forming part of a suspension apparatus, and a wheel hub. The second generation type has a body mounting flange or a wheel mounting flange directly formed on the outer circumference of an outer member. The third generation type has one inner raceway surface directly formed on the outer circumference of a wheel hub. The fourth generation type has inner raceway surfaces formed on the outer circumferences, respectively, of a wheel hub and an outer joint member.

Angular contact ball bearings with an inner ring and an outer member (outer ring) formed by pressing a steel plate is known. For example, FIG. 16 shows an angular contact ball bearing 100 used in a magnetic hard disc device. An outer member 101 and a pair of inner rings 102, 103 are formed by pressing or rolling stainless steel plates.

The outer member 101 is formed substantially at its center with an annular projection 101a projecting radially inward. Outer raceway surfaces 101b, 101c are at either side of the annular projection 101a. The outer member 101 is fit into an aperture of a housing 104 and axially positioned with a flange 101d formed at its one end abutted against the end face of the housing 104. An annular recess 101a, formed by the inner circumferential surface, and the outer circumferential surface of the outer member 101, corresponding to the annular projection 101a, is filled with adhesive to secure the outer member 101 in place.

On the other hand, the inner rings 102, 103 are fit into the outer member 101. Axially outer ends of the inner rings 102, 103 are formed with curved shoulders 102a, 103a, respectively. The curved shoulders 102a, 103a are formed with inner raceway surfaces 102b, 103b, respectively. Double row balls 106, 106 are arranged between the inner raceway surfaces of the inner rings 102, 103 and the double row outer raceway surface 101b, 101b. They are held by cages 107, 107 in each row.

Fitting portions 102c, 103c, to be clearance fit onto a shaft member 105, are formed on the inner circumferences of the inner rings 102, 103, respectively. After the inner rings 102, 103 having been clearance fit onto the shaft member 105, a cylindrical weight 109, having a constant weight, is laid on the curved shoulder portion 102a of one of the inner rings 102. The curved shoulder portion 103a of the other inner ring 103 is pressed against the flange portion 105a of the shaft member 105 via balls 106 by weight 109. Thus, a suitable pre-load is applied to the angular contact ball bearing.

After completion of the clearance fit, a gap between the curved shoulder 102a of one inner ring 102 and the shaft member 105 is filled with adhesive 110. Thus, one inner ring 102 is prevented from slipping off from the shaft member 105. Also, the other inner ring 103 is prevented from slipping off from the shaft member 105 by its flange 105a. (Japanese Laid-open Utility Model Publication No. 1835/1994)

If the angular contact ball bearing 100, with the outer member 101 and the inner rings 102, 103 formed of steel plates by pressing, is used with seals, it is necessary to mount any seals in annular openings formed between the outer member 101 and the inner rings 102, 103. This not only increases the number of parts but significantly modifies the structure to provide spaces for the seals. Thus, this increases manufacturing cost, weight and size.

SUMMARY

It is, therefore, an object of the present disclosure to provide a vehicle wheel bearing apparatus that can reduce the manufacturing cost as well as the weight and size of the wheel bearing.

To achieve the object of the present disclosure, a vehicle wheel bearing apparatus is provided comprising a substantially cylindrical outer ring formed with double row outer raceway surfaces on its inner circumference and with press-fitting surfaces on its outer circumferences of its cylindrical portions. A pair of inner rings is formed with inner raceway surfaces on their outer circumferences. The inner raceway surfaces are arranged opposite to the double row outer raceway surfaces. The inner rings are formed with cylindrical portions having fitting surfaces on their inner circumferences. The fitting surfaces fit onto a cylindrical portion of a wheel hub. The inner rings are adapted to be arranged so that end faces of the cylindrical portions abut each other. Double row rolling elements are freely rollably arranged between outer and inner raceway surfaces. At least the outer ring, of the outer and inner, is formed by pressing or rolling from a plate member or a pipe member. The outer ring and the inner rings have cylindrical portions axially extending, respectively, from the outer raceway surfaces and the inner raceway surfaces. The thickness of the cylindrical portions of the outer ring is thinner than that of the outer raceway surfaces. Seals are arranged in annular spaces formed between the inner circumferences of the cylindrical portions of the outer ring and the outer circumferences of the cylindrical portions of the inner rings. The seals are adapted to be press fit into the inner circumferences of the cylindrical portions of the outer ring. The double row outer raceway surfaces of the outer ring and the inner raceway surfaces of the inner ring are surface hardened.

A substantially cylindrical outer ring is formed with double row outer raceway surfaces on its inner circumference and with press fitting surfaces on its outer circumferences of its cylindrical portions. A pair of inner rings is formed with inner raceway surfaces on their outer circumferences. The inner raceway surfaces are arranged opposite to the double row outer raceway surfaces. The inner rings are formed with cylindrical portions having fitting surfaces on their inner circumferences. The fitting surfaces fit onto a cylindrical portion of a wheel hub. The inner rings are adapted to be arranged so that end faces of the cylindrical portions abut each other. Double row rolling elements are freely rollably arranged between the outer and inner raceway surfaces. At least the outer ring of the outer and inner rings is formed from pressing or rolling a plate member or a pipe member. The outer ring and the inner rings have cylindrical portions axially extending, respectively, from the outer raceway surfaces and the inner raceway surfaces. The thickness of the cylindrical portions of the outer ring is thinner than that of the outer raceway surfaces. Seals are arranged in annular spaces formed between the inner circumferences of the cylindrical portions of the outer ring and the outer circumferences of the cylindrical portions of the inner rings. The seals are adapted to be press fit into the inner circumferences of the cylindrical portions of the outer ring. The double row outer raceway surfaces of the outer ring and the inner raceway surfaces of the inner ring are surface hardened. Thus, it is possible to provide a vehicle wheel bearing apparatus that can prevent the penetration of rain water or dusts into the inside of the wheel bearing and leakage of lubricating grease sealed within the wheel bearing. Also, it provides a long life. In addition, it is possible to have a good sealing ability because of sufficient spaces for mounting the seals provided by the cylindrical portions on the outer and inner rings. Furthermore it is possible to reduce the manufacturing cost because the length of the cylindrical portions can be adjusted without design modification of the wheel hub or the outer joint member of the constant velocity universal joint.

A bearing pre-load is applied by fastening the wheel hub inserted into the pair of inner rings and an outer joint member of a constant velocity universal joint inserted into the wheel hub and by a screw fastening mechanism applying pressure onto the inner rings from either side between a shoulder portion of the wheel hub and a shoulder portion of the outer joint member. This makes it possible to apply a pre-load to the wheel bearing simultaneously with the assembly. Accordingly, it is possible to keep a stable bearing performance and thus to realize a long life of the wheel bearing.

The outer ring and the inner rings are formed by pressing a plate member or a pipe member, with rustproof ability. This makes it possible to prevent the outer member and the inner rings from corroding and thus extends the life of the wheel bearing apparatus.

The outer and inner raceway surfaces of the outer ring and the inner rings have quenched hardened layers. This makes it possible to reduce the generation of friction, abrasion and deformation of the inner and outer raceway surfaces caused by the rolling elements.

The outer ring is formed with axially extending cylindrical portions. Each inner ring is formed at its axially outer end with a radially outwardly extending flange. Seals are mounted in openings formed between the cylindrical portions of the outer ring and the flanges of the inner rings. This makes it possible to provide a vehicle wheel bearing apparatus that can prevent the penetration of rain water or dusts into the inside of the wheel bearing and leakage of lubricating grease sealed within the wheel bearing. Also, it provides a long life. In addition, since the pre-load can be applied to the wheel bearing apparatus at the shoulders of the wheel hub and the outer joint member, it is possible to realize a high bearing performance and thus to provide a wheel bearing apparatus with a long life.

The seals comprise metal cores adapted to be press fit into the inner circumferences of the cylindrical portions of the outer ring. Sealing members are adhered to the metal cores and have a plurality of sealing lips. The sealing lips of the outer-side seal of the seals slidingly contact the shoulder portion of the wheel hub. The sealing lips of the inner side seal of the seals are in sliding contact with the side face of the flange portion of the inner-side inner ring. Since the sealing lips of the outer-side seal is in sliding contact with the shoulder of the wheel hub, it is possible to provide any other surface with which the sealing lips are contacted and thus to reduce the size of the wheel bearing apparatus.

The seals comprise metal cores adapted to be press fit into the inner circumferences of the cylindrical portions of the outer ring. Sealing members adhered to the metal cores and have a plurality of sealing lips. The sealing lips of the outer-side and inner-side seals slidingly contact the side faces of the flange portions of the outer-side and inner-side inner rings. This makes it possible to form the outer-side seal and the inner-side seal with the same structure and thus to realize a reduction in the manufacturing cost.

The seals comprise metal cores adapted to be press fit into the inner circumferences of the cylindrical portions of the outer ring. Sealing members are adhered to the metal cores and have a plurality of sealing lips. The plates, each having a substantially L-shaped cross-section, are arranged at a region of radially outermost circumference and at a side face of each flange portion. The sealing lips of the outer-side and inner-side seals slidingly contact the side faces of the plates. This enables desirable sliding contact surfaces with a small coefficient of friction.

The plates are made of stainless steel. This prevents the generation of corrosion and accordingly the reduction of bearing performance as well as extends the life of the wheel bearing apparatus.

Gaps are formed between the inner circumferences of the cylindrical portions of the outer ring or inner circumferences of the metal cores and outer circumferences of the plates and are set smaller than 1 mm. Since the gaps are small, it is possible to prevent muddy water or dusts from further penetrating deeply into the inside of the wheel bearing apparatus even if they happen to enter into the wheel bearing apparatus.

A stepped recess is formed between the inner raceway surface of the inner ring and inside surface of the flange portion. This prevents tools from interfering with the inside surface of the flange portion during grinding or super finishing of the inner raceway surface formed by pressing and thus to have desirable raceway surfaces. Also, it is possible to perform machining of the inner rings, formed by pressing pipe members, using previous machining facility. In addition, since the outer member and the inner rings can be formed by pressing, it is possible to reduce the weight and manufacturing cost of the wheel bearing apparatus. Furthermore, since the pre-load can be applied to the wheel bearing apparatus at the shoulders of the wheel hub and the outer joint member, it is possible to realize a high bearing performance and thus to provide a wheel bearing apparatus having a long life.

A stepped recess is formed on the outer-side surface of the flange portion. This provides a uniform thickness of the flange portion and thus assures its strength.

Chamfering or rounding is formed on either end of the inner raceway surfaces of the inner rings. Since edges of the ends of the inner raceway surfaces are rounded, it is possible to prevent the edges of the inner raceway surfaces from being damaged by the rolling elements that would contact or scratch the edges.

The chamfering or rounding is formed during grinding or super finishing of either end of the inner raceway surfaces of the inner rings. This improves the machining efficiency during manufacturing of the wheel bearing apparatus.

According to another configuration of the present disclosure, a vehicle wheel bearing apparatus comprises an outer member formed with double row outer raceway surfaces on its inner circumference. An inner member includes a wheel hub formed with a wheel mounting flange on its one end. A cylindrical portion axially extends from the wheel mounting flange. At least one inner ring is positioned on the wheel hub. Double row rolling elements are freely rollably contained between the outer and inner raceway surfaces of the outer member and inner ring. A pair of seals is adapted to be mounted in annular spaces formed between the inner ring and the outer member. The outer member and the inner ring are formed from steel plates by plastic deformation. At least one seal of the pair of seals is integrally adhered to at least one of the outer member and the inner ring.

In a wheel bearing apparatus of the first through third generation types, the wheel hub is integrally formed with the wheel mounting flange at one end and with a double row rolling bearing. The outer member and the inner ring are formed from steel plates by plastic deformation. At least one seal of the pair of seals is integrally adhered to at least one of the outer member and the inner ring. Thus, it is possible to reduce the number of parts and assembly steps as well as manufacturing cost of the wheel bearing apparatus.

The seals are formed from an elastomer and adhered by vulcanized adhesion. They are in sliding contact with the other opposite member. This makes it possible to have desirable sealability.

A radially outwardly extending shoulder portion is formed on one end of the inner ring. The seal is adhered to the shoulder portion. Cylindrical portions are formed on either end of the outer member. The seal slidingly contacts the cylindrical portion.

The outer member is formed at either of its ends with radially inwardly extending shoulder portions. The seals are adhered to the shoulder portions. Each inner ring is formed at its one end with an axially extending cylindrical shoulder portion. The seals are in sliding contact with the cylindrical shoulder portions.

The wheel hub is directly formed on its outer circumference with one of the inner raceway surfaces opposing one of the outer raceway surface. The cylindrical portion extends from the inner raceway surface through a shoulder portion. The inner ring is formed on its outer circumference with the other inner raceway surface opposing the other outer raceway surface. An end face, at a smaller diameter side of the inner ring, is adapted to abut against the shoulder portion. This makes it possible to increase the strength and rigidity of the wheel hub and to reduce the weight and size of the wheel bearing apparatus.

The vehicle wheel bearing apparatus comprises a substantially cylindrical outer ring formed with double row outer raceway surfaces on its inner circumference and with press fitting surfaces on its outer circumferences of its cylindrical portions. A pair of inner rings is formed with inner raceway surfaces on their outer circumferences. The inner raceway surfaces are arranged opposite to the double row outer raceway surfaces. The inner rings are formed with cylindrical portions having fitting surfaces on their inner circumferences. The fitting surfaces fit onto a cylindrical portion of a wheel hub and are adapted to be arranged so that end faces of the cylindrical portions abut each other. Double row rolling elements are freely rollably arranged between outer and inner raceway surfaces. At least the outer ring of the outer and inner rings is formed by pressing or rolling a plate member or a pipe member. The outer ring and the inner rings have cylindrical portions axially extending, respectively, from the outer raceway surfaces and the inner raceway surfaces. The thickness of the cylindrical portions of the outer ring is thinner than that of the outer raceway surfaces. Seals are arranged in annular spaces formed between the inner circumferences of the cylindrical portions of the outer ring and the outer circumferences of the cylindrical portions of the inner rings. The seals are adapted to be press fit into the inner circumferences of the cylindrical portions of the outer ring. The double row outer raceway surfaces of the outer ring and the inner raceway surfaces of the inner ring are surface hardened. Thus, it is possible to provide a vehicle wheel bearing apparatus that can prevent the penetration of rain water or dusts into the inside of the wheel bearing and leakage of lubricating grease sealed within the wheel bearing. Additionally, it has a long life. In addition, it is possible to have a good sealing ability because sufficient space for mounting the seals is provided between cylindrical portions on the outer and inner rings.

The vehicle wheel bearing apparatus comprises an outer member formed with double row outer raceway surfaces on its inner circumference. An inner member includes a wheel hub with a wheel mounting flange formed on its one end. A cylindrical portion axially extends from the wheel mounting flange. At least one inner ring is on the wheel hub. Double row rolling elements are freely rollably contained between the outer and inner raceway surfaces of the outer member and inner ring. A pair of seals is adapted to be mounted in annular spaces formed between the inner ring and the outer member. The outer member and the inner ring are formed from steel plates by plastic deformation. At least one seal of the pair of seals is integrally adhered to at least one of the outer member and the inner ring. Thus, it is possible to have improved productivity and yield and to reduce the number of parts and assembly steps as well as the manufacturing cost of the wheel bearing apparatus.

A wheel bearing apparatus comprises a substantially cylindrical outer ring formed with double row outer raceway surfaces on its inner circumference and with press fitting surfaces on its outer circumferences of its cylindrical portions. A pair of inner rings is formed with inner raceway surfaces on their outer circumferences. The inner raceway surfaces are arranged opposite to the double row outer raceway surfaces. The inner rings are formed with cylindrical portions having fitting surfaces on their inner circumferences. The fitting surfaces fit onto a cylindrical portion of a wheel hub and are adapted to be arranged so that end faces of the cylindrical portions abut each other. Double row rolling elements are freely rollably arranged between outer and inner raceway surfaces. At least the outer ring of the outer and inner ring is formed by pressing or cold rolling from a plate member or a pipe member. The outer ring and the inner rings have cylindrical portions axially extending, respectively, from the outer raceway surfaces and the inner raceway surfaces. The thickness of the cylindrical portions of the outer ring is thinner than that of the outer raceway surfaces. Seals of the sliding contact-type are arranged in annular spaces formed between the inner circumferences of the cylindrical portions of the outer ring and the outer circumferences of the cylindrical portions of the inner rings. The seals are adapted to be press-fit into the inner circumferences of the cylindrical portions of the outer ring. The double row outer raceway surfaces of the outer ring and the inner raceway surfaces of the inner ring are surface hardened by quenching.

Further areas of applicability will become apparent from the description provided herein. The description and specific examples in this summary are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

FIG. 1 is a longitudinal section view of a first embodiment of a vehicle wheel bearing apparatus.

FIG. 2 is a partially enlarged view of FIG. 1.

FIG. 3 shows a method for manufacturing the outer member.

FIG. 3(a) shows a condition before the manufacturing process.

FIG. 3(b) shows a condition during the manufacturing process.

FIG. 4 shows a method for manufacturing the inner ring.

FIG. 4(a) shows a condition before the manufacturing process.

FIG. 4(b) shows a condition during the manufacturing process.

FIG. 5 is a longitudinal section view of a second embodiment of the vehicle wheel bearing apparatus.

FIG. 6 is a partially enlarged view of FIG. 5.

FIG. 7 is a longitudinal section view of a third embodiment of the vehicle wheel bearing apparatus.

FIG. 8 is a longitudinal section view of a fourth embodiment of the vehicle wheel bearing apparatus.

FIG. 9 is a longitudinal section view of a fifth embodiment of the vehicle wheel bearing apparatus.

FIG. 10 is a partially enlarged view of FIG. 9.

FIG. 11 is a longitudinal section view of a sixth embodiment of the vehicle wheel bearing apparatus.

FIG. 12 is a longitudinal section view of a seventh embodiment of the vehicle wheel bearing apparatus.

FIGS. 13(a) and 13(b) are longitudinal section views of the respective outer member and the inner ring.

FIG. 14 is a longitudinal section view of an eighth embodiment of the vehicle wheel bearing apparatus.

FIG. 15 is a longitudinal section view of a ninth embodiment of the vehicle wheel bearing apparatus FIG. 16 is a longitudinal section view of an angular contact ball bearing of the prior art where the inner and outer rings are formed by a pressing process.

DETAILED DESCRIPTION

Preferable embodiments of the present disclosure will be hereinafter described with reference to the drawings.

FIG. 1 is a longitudinal section view of a first embodiment of a vehicle wheel bearing apparatus. FIG. 2 is a partially enlarged view of FIG. 1. In descriptions below, the term "outer-side" defines a side that is positioned outside of a vehicle body (left-hand side of FIG. 1). The term "inner-side" defines a side that is positioned inside of a vehicle body (right-hand side of FIG. 1) when the bearing apparatus is mounted on the vehicle body.

The vehicle wheel bearing apparatus of the present disclosure is formed as a unit of a detachable combination of a wheel hub 1, a double row rolling bearing 2 and a constant velocity universal joint 3.

As shown in FIG. 2, the double row rolling bearing 2 includes an outer member (outer ring) 4 formed on its inner circumference with double row outer raceway surfaces 4a, 4a. A pair of inner rings 5, 5 is formed with double row inner raceway surfaces 5a, 5a on their outer circumference. The inner raceway surfaces are adapted to be arranged opposite to the outer raceway surfaces 4a, 4a. Double row rolling elements (balls) 6, 6 are freely rollably contained between the outer and inner raceway surfaces 4a, 4a and 5a, 5a. The outer member 4 and the inner ring 5 are formed by pressing a plate member of stainless steel or a pipe member having rustproof ability.

The outer member 4 has a substantially cylindrical circumference and is press fit into a knuckle 7. The knuckle 7 is formed on its inner-side with a radially inwardly extending projection 7a. The outer member 4 is positioned by the projection 7a with the inner-side face of the outer member 4 abutting against the projection 7a. The height of the projection 7a is substantially the same as the thickness of the side face of the outer member.

The outer member 4 is formed, substantially at its center, with a radially inwardly projecting annular projection 4b by a pressing or rolling process. The outer member 4 is also formed at either side of the annular projection 4b with one of the double row outer raceway surfaces 4a, 4a. Each surface has a substantially circular arc cross-section. Axially extending cylindrical portions 4c, 4c are formed at both ends of the outer member 4 adjacent to each outer raceway surface 4a. The thickness of the cylindrical portions 4c, 4c is smaller than that of the outer raceway surfaces 4a, 4a. At least the outer raceway surfaces 4a, 4a are surface hardened by carburizing quenching.

The inner rings 5, 5 each have the same configuration and are arranged so that they abut each other in a symmetric manner without any gap between the abutting portion 5b. The inner rings 5, 5 are formed with first cylindrical portions 5c, 5c that axially extend from the abutted portion 5b. The inner rings 5, 5 are formed with inner raceway surfaces 5a, 5a. Each surface has a substantially circular arc cross-section adjacent to the first cylindrical portions 5c, 5c. Axially extending second cylindrical portions 5d, 5d are further formed on the inner rings 5, 5 on the side of the inner raceway surfaces 5a, 5a. At least the inner raceway surfaces 5a, 5a are surface hardened by carburizing quenching.

Double row rolling elements 6, 6 are contained between the double row outer raceway surfaces 4a, 4a and inner raceway surfaces 5a, 5a. The rolling elements 6, 6 are freely rollably held by cages 8, 8. Although balls are shown as the rolling elements in the illustrated example, tapered rollers may be used as the rolling elements.

Seals 13, 13 are mounted in annular openings formed between the cylindrical portions 4c, 4c of the outer member 4 and the second cylindrical portions 5d, 5d of the inner rings 5, 5. Each seal 13 includes a core metal 11 with a substantially sideways turned "v"-shaped cross-section. A sealing member 12 is adhered to the metal core 11. The metal core 11 is formed by a pressing process of a plate member or pipe member with rustproof ability. Outer circumferences of the core metals 11, 11 of both the seals 13, 13 are press-fit into the inner circumferences of the cylindrical portions 4c, 4c of the outer member 4. Each seal member 12 has an adhering portion 12a, to be adhered to the metal core 11, and two sealing lips 12b, 12c. Tip ends of the sealing lips 12b, 12c are adapted to be in sliding contact with the outer circumference of the second cylindrical portion 5d of the inner ring 5. Since the sealing lips 12b, 12c have elasticity and the core metal 11 has the sideways turned "v"-shaped cross-section, the seal 13 can be mounted between the cylindrical portion 4c of the outer member 4 and the second cylindrical portion 5d of the inner ring 5 under a moderately elastically deformed condition. Thus, it is possible to effectively prevent leakage of lubricating grease sealed within the bearing apparatus and the penetration of rain water or dusts from the outside of the bearing apparatus.

The wheel hub 1 has a cylindrical portion 1a that axially extends toward the inner side. The inner rings 5, 5 are tightly fit onto the cylindrical portion 1a without any clearance.

The wheel hub 1 also has a wheel mounting flange 1b for mounting a wheel (not shown) at the outer-side end. Hub bolts (not shown) are equidistantly mounted on the wheel mounting flange 1b along its periphery. The wheel hub 1 is formed on its inner circumference with serration (or spline) 1d for torque transmission purposes. A shoulder portion 1e of the wheel hub 1 abuts against the side face of the outer-side inner ring 5. The wheel hub 1 is made of medium carbon steel including carbon of 0.40-0.80% by weight such as S53C. At least the outer circumference of the cylindrical portion 1a is hardened by high frequency induction quenching to have a surface hardness of 58-64 HRC.

The constant velocity universal joint 3 includes an outer joint member 14, a joint inner ring 15, a cage 16, and torque transmitting balls 17. The outer joint member 14 has a cup-shaped mouth portion 18, a shoulder portion 19, forming the bottom of the mouth portion 18, a shaft portion 20 axially extending from the shoulder portion 19 toward the outer-side, and an outer threaded portion 21. Track grooves 18a, 15a are formed, respectively, on the inner circumference of the mouth portion 18 and the outer circumference of the joint inner ring 15. The shaft portion 20 of the outer joint member 14 is formed with serration (or spline) for torque transmission purpose. A shoulder portion 19 of the outer joint member 14 abuts the side face of the inner-side inner ring 5. The outer joint member 14 is made of medium carbon steel including carbon of 0.40-0.80% by weight such as S53C. The outer circumference region from track grooves 18a, 15a to the shaft portion 20 through the shoulder 19 is hardened by high frequency induction quenching to have a surface hardness of 58-64 HRC.

The shaft 20 of the outer joint member 14 is fit into the wheel hub 1. Torque can be transmitted between the outer joint member 14 and the wheel hub 1 through their serration 20a, 1d. A spindle nut 22 is fastened by a predetermined torque onto the outer threaded portion 21. Accordingly, a predetermined pre-load can be applied to the bearing 2 through abutment between the shoulder portion 1e of the wheel hub 1 and the side face of the outer-side inner ring 5 and abutment between the shoulder portion 19 of the outer joint member 14 and the side face of the inner-side inner ring 5 when the spindle nut 22 is fastened.

A method for manufacturing the outer member 4 and the inner ring 5 will be described.

FIG. 3 shows the manufacturing method of the outer member 4. FIG. 3(a) shows a condition before the machining process. FIG. 3(b) shows a condition during machining process. FIG. 4 shows the manufacturing method of the inner ring 5. FIG. 4(a) shows a condition before the machining process. FIG. 4(b) shows a condition during machining process.

A pipe member 50 of stainless steel with rustproof ability for forming a base member of the outer member 4 is shown in a cross-section in FIG. 3(a). The pipe member 50 is formed from a long pipe by cutting it to a pipe of a desired length. Burrs are removed at both ends of the cut pipe member. Finally, the pipe is finished by lathe turning inner and outer circumferential surfaces. An axially extending mandrel 51 is inserted into the pipe member 50. A gap remains between the inner circumference of the pipe member 50 and the mandrel 51. The outer circumference of the mandrel 51 is formed with projections 51a, 51b to form the outer raceway surfaces 4a, 4a of the outer member 4. A forming roll 52, to be contacted with the outer circumference of the pipe member 50, is arranged at the outside of the pipe member 50. The inner circumference of the forming roll 52 is formed with a die such as a projection 52a to form the annular projection 4b of the outer member 4.

The pipe material 50 is sandwiched between the forming roll 52 and the mandrel 51 to perform the manufacturing process of the outer member 4 as shown in FIG. 3(b). A desired configuration can be formed around the inner and outer circumferences of the pipe 50 by rotating at least one of the forming roll 52 and the mandrel 51. Finally, unnecessary end portions of the formed pipe member 50 are removed by a machining process. Thus, the outer member 4 is finished by such a cold rolling process.

A pipe member 53 of stainless steel with rustproof ability forms a base member of the inner ring 5. It is shown in a cross-section view in FIG. 4(a). The pipe member 53 is formed from a long pipe member by cutting it into a pipe of a desired length. Burrs are removed at both ends of the cut pipe member. Finally, the pipe is finished by lathe turning inner and outer circumferential surfaces. An axially extending inner die 54 is inserted into the pipe member 53. A gap remains between the inner circumference of the pipe member 53 and the inner die 54. The outer circumference of the inner die 54 is formed with a projection and recess to form the inner circumference of the inner ring 5. An outer die 55, to be contacted with the outer circumference of the pipe member 53, is arranged at the outside of the pipe member 53. The inner circumference of the outer die 55 is formed with a die projection 55a to form the inner raceway surface 5a of the inner ring 5.

The pipe material 53 is sandwiched between the inner die 54 and the outer die 55 to perform the manufacturing process of the inner ring 5 as shown in FIG. 4(b). It is pressed to form a desired configuration around the inner and outer circumferences of the pipe 53. Finally, unnecessary end portions of the formed pipe member 53 are removed by a machining process. Thus, the inner ring 5 is finished by such a pressing process.

Although illustrated examples of manufacturing the outer member 4 and the inner ring 5 are shown using pipe members as their base member, it is also possible and within the scope of the present disclosure to use flat plates as base members of the outer member 4 and the inner ring 5 and to perform similar manufacturing process on them. In addition, although it is shown in the illustrated examples that the outer member 4 is formed by a rolling process and the inner ring 5 is formed by a pressing process, it is also within the scope of the present disclosure to form the outer member 4 by pressing and to form the inner ring 5 by rolling. Furthermore, it is also within the scope of the present disclosure to form at least one of the outer member 4 and the inner ring 5 from plate members or pipe members by pressing or rolling. The other of the outer member 4 and the inner ring 5 may be formed by any other manufacturing process such as by forging.

FIG. 5 is a longitudinal section view of a second embodiment of the vehicle wheel bearing apparatus. FIG. 6 is a partially enlarged view of FIG. 5. The same reference numerals as those used in the first embodiment are also used in the second embodiment and thus detailed description of them will be omitted.

The vehicle wheel bearing apparatus is formed as a unit of a detachable combination of a wheel hub 1, a double row rolling bearing 23 and a constant velocity universal joint 3.

As shown in FIG. 6, the double row rolling bearing 23 includes an outer member 4 formed with double row outer raceway surfaces 4a, 4a on its inner circumference. A pair of inner rings 24, 24 is formed with double row inner raceway surfaces 5a, 5a on their outer circumference. The double row inner raceway surfaces 5a, 5a are adapted to be arranged opposite to the outer raceway surfaces 4a, 4a. Double row rolling elements 6, 6 are freely rollably contained between the outer and inner raceway surfaces 4a, 4a and 5a, 5a. The outer member 4 and the inner rings 24 are formed by pressing a plate member or a pipe member of case-hardened steel, bearing steel or stainless steel with rustproof ability.

The inner rings 24, 24 each have the same configuration and are arranged so that they abut each other in a symmetric manner without any gap between the abutted portion 5b. The inner rings 24, 24 are formed with first cylindrical portions 5c, 5c that axially extend from the abutted portion 5b. The inner rings 24, 24 are formed with inner raceway surfaces 5a, 5a. Each surface 5a, 5a has a substantially circular arc cross-section adjacent to the first cylindrical portions 5c, 5c. Flange portions 5e, 5e are further formed on the inner rings 24, 24 on the side of the inner raceway surfaces 5a, 5a. At least the inner raceway surfaces 5a, 5a are surface hardened by dip hardening or carburizing quenching.

Seals 25, 26 are mounted in inner-side and outer-side openings formed between the cylindrical portions 4c, 4c of the outer member 4 and the flange portions 5e, 5e of the inner rings 24, 24. Seals 25, 26 include metal cores 27, 28 with a substantially "L"-shaped cross-section. Sealing members 29, 30 are adhered to the metal cores 27, 28. The metal cores 27, 28 are formed by a pressing process of a plate member or pipe member with rustproof ability. Outer circumferences of the metal cores 27, 28 are press-fit into the inner circumferences of the cylindrical portions 4c, 4c of the outer member 4. Seal members 29, 30 have an adhering portions 29a, 30a to be adhered to the core metals 27, 28 and, respectively, two sealing lips 29b, 29c; 30b, 30c. Tip ends of the sealing lips 29b, 29c are adapted to be in sliding contact with the side face of the flange portion 5e of the inner-side inner ring 24. Tip ends of the sealing lips 30b, 30c are adapted to be in sliding contact with the shoulder portion 1e of the wheel hub 1. These sealing lips 29b, 29c; 30b, 30c effectively prevent leakage of lubricating grease sealed within the bearing apparatus and the penetration of rain water or dusts from the outside of the bearing apparatus.

The wheel hub 1 has a cylindrical portion 1a that axially extends toward the inner-side. The inner rings 24, 24 are tightly fit onto the cylindrical portion 1a without any clearance therebetween.

The shaft 20 of the outer joint member 14 is fit into the wheel hub 1 as shown in FIG. 5. Torque can be transmitted between the outer joint member 14 and the wheel hub 1 through their serrations 20a, 1d. A spindle nut 22 is fastened by a predetermined torque onto the outer threaded portion 21. Accordingly, a predetermined pre-load can be applied to the bearing 23 through abutment between the shoulder portion 1e of the wheel hub 1 and the side face of the flange portion 5e of the outer-side inner ring 24 and the abutment between the shoulder portion 19 of the outer joint member 14 and the side face of the flange portion 5e of the inner-side inner ring 24, when the spindle nut 22 is fastened.

A third embodiment will be described with respect to the accompanying drawings.

FIG. 7 is a longitudinal section view of an essential part of the third embodiment of the vehicle wheel bearing apparatus. The same reference numerals as those used in the previous embodiments are also used in the third embodiment and thus detailed description of them will be omitted.

Seals 25, 25 are mounted in the inner-side and outer-side openings formed between the cylindrical portions 4c, 4c of the outer member 4 and the flange portions 5e, 5e of the inner rings 24, 24. Tip ends of the sealing lips 29b, 29c are adapted to be in sliding contact with the side face of the flange portion 5e of the inner-side inner rings 24. These sealing lips 29b, 29c effectively prevent leakage of lubricating grease sealed within the bearing apparatus and the penetration of rain water or dusts from the outside of the bearing apparatus.

A fourth embodiment will be described with respect to the accompanying drawings.

FIG. 8 is a longitudinal section view of an essential part of the fourth embodiment of the vehicle wheel bearing apparatus. The same reference numerals as those used in the previous embodiments are also used in this embodiment. Thus, detailed description of them will be omitted.

Seals 25, 25 are mounted in the inner-side and outer-side openings formed between the cylindrical portions 4c, 4c of the outer member 4 and the flange portions 5e, 5e of the inner rings 24, 24. In this embodiment, plates 31, 31, each having a substantially "L"-shaped cross-section, are arranged to cover the radially outermost portions of the flanges 5e, 5e of the outer-side and inner-side inner rings 24, 24 and portions of the side faces of the flanges 5e, 5e. Each plate 31 includes an axially extending cylindrical portion 31a and a radially inwardly extending flange portion 31b. The cylindrical portion 31a is press fit onto the radially outermost portion of the flange portion 5e. The flange portion 31b is contacted with the side face of the flange portion 5e. The plates 31 are formed by a pressing process of a stainless steel plate. A gap between the inner circumferential surface of the cylindrical portion 4c of the outer member 4 or of the core metal 27 and the outer circumferential surface of the cylindrical portion 31a of the plate 31 is preferably 1 mm or less, more preferably a range 0.3 mm or more and 0.8 mm or less. Tip ends of the sealing lips 29b, 29c sliding contact the side faces of the inner-side and outer-side flange portions 31b.

FIG. 9 is a longitudinal section view of a fifth embodiment of the vehicle wheel bearing apparatus. FIG. 10 is a partially enlarged view of FIG. 9. Since the bearing portion has a symmetric configuration, only a right-half is shown in FIG. 10. This embodiment is substantially the same as the third embodiment (FIG. 7) except for a partial structure of the inner ring. Thus, the same reference numerals as those used in the third embodiment are also used in this embodiment and their detailed description will be omitted.

The vehicle wheel bearing apparatus is formed as a unit of a detachable combination of a wheel hub 1, a double row rolling bearing 32 and a constant velocity universal joint 3.

As shown in FIG. 10, the double row rolling bearing 32 includes an outer member 4 formed on its inner circumference with double row outer raceway surfaces 4a, 4a. A pair of inner rings 33, 33 is formed with double row inner raceway surfaces 5a, 5a on their outer circumference. The double row inner raceway surfaces 5a, 5a are adapted to be arranged opposite to the outer raceway surfaces 4a, 4a. Double row rolling elements 6, 6 are freely rollably contained between the outer and inner raceway surfaces 4a, 4a and 5a, 5a. The outer member 4 and the inner rings 33 are formed by pressing a plate member or a pipe member of case-hardened steel, bearing steel or stainless steel with rustproof ability.

The inner rings 33, 33 have the same configuration and are arranged so that they abut each other in a symmetric manner without any gap between the abutted portion 5b. The inner rings 33, 33 are formed with first cylindrical portions 5c, 5c that axially extend from the abutted portion 5b. The inner rings 33, 33 are formed with inner raceway surfaces 5a, 5a. Each surface 5a, 5a has a substantially circular arc cross-section adjacent to the first cylindrical portions 5c, 5c. Flange portions 5e, 5e are further formed on the inner rings 33, 33 on the side of the inner raceway surfaces 5a, 5a.

A stepped recessΔA is formed between the inner raceway surface 5a of the inner ring 33 and are inside surface of the flange portion 5e. The stepped recessΔA is formed by reducing the thickness of the inner ring 33 over a region from the end of inner raceway surface 5a to the inside surface of the flange portion 5e. The stepped recessΔA prevents tools from interfering with the inside surface of the flange portion 5e during grinding or super finishing of the inner raceway surface 5a that is formed by pressing. Thus, it provides a desirable raceway surface 5a.

Chamfering or rounding is formed on either end of the inner raceway surfaces 5a of the inner ring 33. Since edges of the ends of the inner raceway surface 5a are rounded, it is possible to prevent the edges of the inner raceway surface 5a from being damaged by the rolling elements 6 which would contact or scratch the edges. The chamfering or rounding is formed during grinding or super finishing of either end of the inner raceway surface 5a of the inner ring 33.

Seals 25, 25 are mounted in inner-side and outer-side openings formed between the cylindrical portions 4c, 4c of the outer member 4 and the flange portions 5e, 5e of the inner rings 33, 33. Seals 25 include metal cores 27 with a substantially "L"-shaped cross-section. Sealing member 29 is adhered to the metal cores 27.

The wheel hub 1 has a cylindrical portion 1a that axially extends toward the inner-side. The inner rings 33, 33 are tightly fit onto the cylindrical portion 1a without any clearance between the two.

The shaft 20 of the outer joint member 14 is fit into the wheel hub 1 as shown in FIG. 9. Torque can be transmitted between the outer joint member 14 and the wheel hub 1 through their serrations 20a, 1d. A spindle nut 22 is fastened by a predetermined torque onto the outer threaded portion 21. Accordingly, a predetermined pre-load can be applied to the bearing 32 through abutment between the shoulder portion 1e of the wheel hub 1 and the side face of the flange portion 5e of the outer-side inner ring 33 and the abutment between the shoulder portion 19 of the outer joint member 14 and the side face of the flange portion 5e of the inner-side inner ring 33, when the spindle nut 22 is fastened.

A sixth embodiment will be described with respect to the accompanying drawings.

FIG. 11 is a longitudinal section view of an essential part of the sixth embodiment of the vehicle wheel bearing apparatus. The same reference numerals as those used in the previous embodiments are also used in the sixth embodiment. Thus, detailed description of them will be omitted.

In this embodiment, not only the stepped recess ΔA is formed between the inner raceway surface 5a of the inner ring 34 and the inside surface of the flange portion 5e, but a stepped recess ΔB is formed on the outside surface of the flange portion 5e. The stepped recess ΔB is formed by a deformation of part of the flange portion 5e rightward in FIG. 11 by the stepped recess ΔA. That is, the flange portion 5e has a substantially uniform thickness. The stepped recess ΔB is formed between the outer circumference of the shoulder 19 of the outer joint member 14 and the inner circumference of the seal 25. This prevents the surface with which the shoulder 19 contacts from being deformed as a step. Also, it prevents the sliding contact surface of the seal 25 from being deformed as a step.

FIG. 12 is a longitudinal section view of a seventh embodiment of the vehicle wheel bearing apparatus. FIG. 13(a) is a longitudinal section view only of the outer member in FIG. 12. FIG. 13(b) is a longitudinal section view of only the inner ring in FIG. 12. The same reference numerals as those used in the previous embodiments are also used in this embodiment. Thus, a detailed description of them will be omitted.

The vehicle wheel bearing apparatus has a structure of the first generation type and includes a wheel hub 1, and a double row rolling bearing 35 mounted on the wheel hub 1. A constant velocity universal joint 3 is inserted into the wheel hub 1 so that a torque can be transmitted between the two. The wheel hub 1 and the constant velocity universal joint are separately united by a spindle nut 22.

The double row rolling bearing 35 is fit into the knuckle 7 and includes the outer member 36 formed on its inner circumference with double row outer raceway surfaces 36a, 36a. A pair of inner rings 37, 37 is each formed with double row inner raceway surfaces on its outer circumference. The inner raceway surface 37a is arranged opposite to one of the outer raceway surfaces 36a, 36a. Double row rolling elements 6, 6 are freely rollably contained by cages 8, 8 between the outer and inner raceway surfaces. The inner rings 37, 37 abut against each other at their smaller diameter ends 37b, 37b and form a double row angular contact ball bearing of a so-called "back-to-back duplex type".

The outer member 36 and the inner ring 37 are formed of carburized steel plates having a relatively small amount of carbon such as e.g. SCr 420 or SCM 415. They are formed by a pressing or rolling process (hereinafter referred to "plastic deformation process") and are hardened by carburizing quenching to have a surface hardness of 50-64 HRC. Other members may be used for the outer member 36 and the inner ring 37 such as e.g. SCM 440, cold rolled steel plate (JIS SPCC family) or carbon steels such as S45C. In the case of the cold rolled steel plates or carbon steels, at least double row outer raceway surfaces 36a, 36a of the outer member 36 and at least inner raceway surface 37a of the inner ring 37 are hardened by high frequency induction quenching to have their surface hardness of 50-64 HRC to improve the rolling fatigue life. If necessary, the outer and inner raceway surfaces are ground or super finished.

The structure of the outer member 36 and the inner ring 37 will be described in detail with reference to FIG. 13.

The outer member 36 is formed to have a cylindrical configuration firstly by punching out a rolled steel plate to a circular blank having a predetermined outer diameter. The blank is deep drawn into a cup-shaped member. Finally, a bottom of the cup-shaped member is punched out to form a cylindrical blank. As shown in FIG. 13(a), the inner circumference of the cylindrical blank is plastically deformed to form an annular projection 38 projecting radially inward. Furthermore, double row outer raceway surfaces 36a, 36a are formed by plastic deformation at either side of the annular projection 38 as well as cylindrical portions 39, 39 at both ends of the cylindrical blank functioning as seal-lands of seals 41 hereinafter described.

A blank of the inner ring 37 is formed similarly to the outer member 36 by firstly punching out a rolled steel plate into a circular blank having a predetermined outer diameter. The blank is deep drawn into a cup-shaped member. Finally, a bottom of the cup-shaped member is punched out to form a cylindrical blank. As shown in FIG. 13(b), the outer circumference of the cylindrical blank is plastically deformed to form an inner raceway surface 37a and a shoulder 40 that extends radially outward from the inner raceway surface 37a.

The inner ring 37 is press fit onto the cylindrical portion 1a of the wheel hub 1 and sandwiched between the shoulder portion 1e and the constant velocity universal joint 3. The shoulder portion 40 of the inner ring 37 abuts against the shoulder portion 1e of the wheel hub 1 and the constant velocity universal joint 3. A predetermined pre-load is applied to the bearing 35 by fastening the spindle nut 22 at a predetermined fastening torque.

According to this embodiment, seal 41 is integrally adhered to the shoulder portion 40 of the inner ring 37. That is, the seal 41 is formed of an elastomer such as nitrile rubber and includes a pair of radial lips that are integrally adhered by vulcanized adhesion to the shoulder 40. As shown in FIG. 12, the seal 41 is adapted to contact with the inner circumference of the cylindrical portion 39 of the outer member 36 to prevent leakage of grease sealed within the bearing and the penetration of rain water and dusts into the bearing from the outside. This keeps a desirable sealability, to reduce the number of parts of the bearing and assembling steps. Thus, this reduces the manufacturing cost.

In addition, according to this embodiment, since the outer member 36 and the inner ring 37 are formed by plastic deformation substantially without a cutting step, it is possible to improve the productivity and the yield of the wheel bearing. Thus, this reduces its manufacturing cost. Although it is shown in the illustrated example as a double row rolling bearing using balls as rolling elements, it is possible to use a double row tapered roller bearing using tapered rollers as the rolling elements.

FIG. 14 is a longitudinal section view of an eighth embodiment of the vehicle wheel bearing apparatus. Since this embodiment is different from the seventh embodiment only in the structure of the wheel hub, the same reference numerals as those used in the seventh embodiment are also used in this embodiment. Thus, a detailed description of them will be omitted.

This wheel bearing apparatus has a structure of the third generation type. It includes an outer member 36, and an inner member 43 including a wheel hub 42 and an inner ring 37 press fit onto the wheel hub 42. A constant velocity universal joint 3 is inserted into the wheel hub 42 so that a torque can be transmitted therebetween. The wheel hub 42 and the constant velocity universal joint 3 are separately united by a spindle nut 22.

The wheel hub 42 has a wheel mounting flange 1b and is formed with an inner raceway surface on its outer circumference. The inner raceway surface 42a opposes the outer-side outer raceway surface 36a of the double row outer raceway surfaces 36a, 36a. A cylindrical portion 42b axially extends from the inner raceway surface 42a. The wheel hub 42 are also formed on its inner circumference with serration (or spline) 1d for torque transmission. The wheel hub 42 is made of medium carbon steel including carbon of 0.40-0.80% by weight such as S53C. A region from a base 42c of the flange forming a seal-land portion of the outer-side seal 44 to the cylindrical portion 42b through the inner raceway surface 42a is hardened by high frequency induction quenching to have a surface hardness of 58-64 HRC.

The inner rings 37 is press fit onto the cylindrical portion 42b of the wheel hub 42. Its end face 37b of a smaller diameter side abuts against the shoulder portion 42d of the wheel hub 42 and forms a double row angular contact ball bearing of the back-to-back duplex type. The inner ring 37 is sandwiched between the constant velocity universal joint 3 and the shoulder portion 42d of the wheel hub 42. The shoulder portion 40 of the inner ring 37 abuts against the shoulder portion 42d of the wheel hub 42 and the constant velocity universal joint 3. A predetermined pre-load is applied to the bearing by fastening the spindle nut 22 at a predetermined fastening torque.

According to this embodiment, seal 41 is integrally adhered to the shoulder portion 40 of the inner ring 37. The elastomer seal is fit into the outer-side cylindrical portion 39 of the outer member 36. These seals 41, 44 are in sliding contact with the inner circumference of the inner-side cylindrical portion 39 of the outer member 36. The flange base 42c prevents leakage of grease sealed within the bearing and the penetration of rain water and dusts into the bearing from the outside. This increases the strength and rigidity of the wheel hub 42 and keeps a desirable sealability to reduce the weight and size of the bearing apparatus.

FIG. 15 is a longitudinal section view of a ninth embodiment of the vehicle wheel bearing apparatus. The same reference numerals as those used in the previous embodiments are also used in this embodiment. Thus, a detailed description of them will be omitted.

This wheel bearing apparatus has a structure of the first generation type. It includes a wheel hub 1, and a double row rolling bearing 45 mounted on the wheel hub 1. The double row rolling bearing 45 includes the outer member 46 formed with double row outer raceway surfaces 36a, 36a on its inner circumference. A pair of inner rings 47, 47 is formed with inner raceway surfaces 37a, 37a on its outer circumference. The inner raceway surface 37a, 37a are arranged opposite to the outer raceway surfaces 36a, 36a. Double row rolling elements 6, 6 are freely rollably contained by cages 8, 8 between the outer and inner raceway surfaces.

The outer member 46 and the inner rings 47 are formed of carburized steel plates, having a relatively small amount of carbon such as e.g. SCr 420 or SCM 415, by plastic deformation. They are hardened by carburizing quenching to have a surface hardness of 50-64 HRC. If necessary the outer and inner raceway surfaces are ground or super finished.

The outer member 46 is formed with the double row outer raceway surfaces 36a, 36a on its inner circumference. It is also formed by plastic deformation with radially inwardly extending shoulders 48 at both ends of the outer member 46. Elastomeric seals 49, 49 are integrally adhered by vulcanized adhesion to the shoulders 48. The inner-side shoulder 48 is formed with a stepped recess 48a engaged by the projection 7a of the knuckle 7 to position it on the outer member 46.

On the other hand, similarly to the outer member 46, each inner ring 47 is formed by plastic deformation. The inner ring includes the inner raceway surface on its outer circumference. A second cylindrical portion 5d axially extends from the inner raceway surface 37a. The inner ring 47 is press fit onto the cylindrical portion 1a of the wheel hub 1 and sandwiched between the shoulder portion 1e and the constant velocity universal joint 3. The second cylindrical portion 5d of the inner ring 47 abuts against the shoulder portion 1e of the wheel hub 1 and the constant velocity universal joint 3. A predetermined pre-load is applied onto the bearing 45 by fastening the spindle nut 22 at a predetermined fastening torque.

According to this embodiment, seals 49, 49 are integrally adhered to the shoulder portions 48, 48 of the outer member 46. They are adapted to contact with the second cylindrical portions 5d, 5d of the inner rings 47, 47 to prevent leakage of grease sealed within the bearing and the penetration of rain water and dusts into the bearing from the outside. This reduces the number of parts of the bearing and assembly steps, and thus reduces the manufacturing cost.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

The wheel bearing apparatus can be applied to any of the bearing apparatus of the first through third generation types to freely rotationally support a vehicle wheel such as an automobile.

What is claimed is:

1. A vehicle wheel bearing apparatus comprising:
a substantially cylindrical outer ring formed with double row outer raceway surfaces on its inner circumference, and formed with press-fitting surfaces on an outer circumference of the outer ring first cylindrical portions;
a pair of inner rings formed with inner raceway surfaces on their outer circumferences; said inner raceway surfaces arranged opposite to the double row outer raceway surfaces, said inner rings formed with first cylindrical portions having fitting surfaces on their inner circumferences, said fitting surfaces of said inner rings fit onto a cylindrical portion of a wheel hub, said inner rings are adapted to be arranged so that end faces of the it cylindrical portions of the inner rings abut each other;
double row rolling elements are freely rollably arranged between outer and inner raceway surfaces;
at least the outer ring of the outer and inner rings is formed by pressing or rolling from a plate member or a pipe member;
the outer ring and the inner rings have second cylindrical portions axially extending, respectively, from the outer raceway surfaces and the inner raceway surfaces, a thickness of the second cylindrical portions of the outer ring is thinner than that of the outer raceway surfaces;
seals are arranged in annular spaces formed between the inner circumferences of the second cylindrical portions of the outer ring and the outer circumferences of the second cylindrical portions of the inner rings, the seals are adapted to be press-fit into the inner circumferences of the second cylindrical portions of the outer ring; and
the double row outer raceway surfaces of the outer ring and the inner raceway surfaces of the inner ring are surface hardened.

2. The vehicle wheel bearing apparatus of claim 1, wherein a bearing pre-load is applied by fastening the wheel hub inserted into the pair of inner rings and an outer joint member of a constant velocity universal joint inserted into the wheel hub by a screw fastening means and applying a pressure on the inner rings from either side between a shoulder portion of the wheel hub and a shoulder portion of the outer joint member.

3. The vehicle wheel bearing apparatus of claim 1, wherein the outer ring and the inner rings are formed by pressing a plate member or a pipe member with rustproof ability.

4. The vehicle wheel bearing apparatus of claim 1, wherein the outer and inner raceway surfaces of the outer ring and the inner rings have quench hardened layers.

5. The vehicle wheel bearing apparatus of claim 1, wherein the outer ring is formed with axially extending second cylindrical portions and each inner ring is formed at its axially outer end with a radially outwardly extending flange, and the seals are mounted in openings formed between the second cylindrical portions of the outer ring and the flanges of the inner rings.

6. The vehicle wheel bearing apparatus of claim 5, wherein the seals comprises metal core adapted to be press fit into the inner circumferences of the second cylindrical portions of the outer ring, and sealing members are adhered to the metal core and have a plurality of sealing lips, said sealing lips of the outer-side seal of the seals in sliding contact with the shoulder portion of the wheel hub, and the sealing lips of the inner-side seal of the seals are in sliding contact with the side face of the flange portion of the inner-side inner ring.

7. The vehicle wheel bearing apparatus of claim 5, wherein the seals comprises metal cores adapted to be press fit into the inner circumferences of the second cylindrical portions of the outer ring, and sealing members adhered to the metal core and have a plurality of sealing lips, said sealing lips of the outer-side and inner-side seals are in sliding contact with the side faces of the flange portions of the outer-side and inner-side inner rings.

8. The vehicle wheel bearing apparatus of claim 5, wherein the seals comprises metal core adapted to be press fit into the inner circumferences of the second cylindrical portions of the outer ring, and sealing members adhered to the core metals and have a plurality of sealing lips, wherein plates each have a substantially L-shaped cross-section are arranged on a region of a radially outermost circumference and a side face of each flange portion, and wherein the sealing lips of the outer-side and inner-side seals are in sliding contact with the side faces of the plates.

9. The vehicle wheel bearing apparatus of claim 8, wherein the plates are made of stainless steel.

10. The vehicle wheel bearing apparatus of claim 8, wherein gaps are formed between the inner circumferences of the second cylindrical portions of the outer ring or inner circumferences of the metal core and outer circumferences of the plates is set smaller than 1 mm.

11. The vehicle wheel bearing apparatus of claim 5, wherein a stepped recess is formed between the inner raceway surface of the inner ring and inside surface of the flange portion.

12. The vehicle wheel bearing apparatus of claim 11, wherein a stepped recess is formed on the outer-side surface of the flange portion.

13. The vehicle wheel bearing apparatus of claim 11, wherein chamfering or rounding is formed on either end of the inner raceway surfaces of the inner rings.

14. The vehicle wheel bearing apparatus of claim 13, wherein the chamfering or rounding is formed during grinding or super finishing of either end of the inner raceway surfaces of the inner rings.

15. A vehicle wheel bearing apparatus comprising:
an outer member formed with double row outer raceway surfaces on its inner circumference;
an inner member including a wheel hub formed, on its one end, with a wheel mounting flange, a cylindrical portion axially extends from the wheel mounting flange, and at least one inner ring with an inner raceway surface;
double row rolling elements are freely rollably contained between the outer and inner raceway surfaces of the outer member and inner ring; and
a pair of seals are adapted to be mounted in annular spaces formed between the inner ring and the outer member;
the outer member and the inner ring are formed from steel plates by plastic deformation; and
at least one seal of the pair of seals is integrally adhered to at least one of the outer member and the inner ring.

16. The vehicle wheel bearing apparatus of claim 15, wherein the seals are formed of elastomer and adhered by vulcanized adhesion to be in sliding contact with the other opposite member.

17. The vehicle wheel bearing apparatus of claim 15, wherein a radially outwardly extending shoulder portion is formed on one end of the inner ring and the seal is adhered to the shoulder portion, and cylindrical portions are formed on either end of the outer member and the seal sliding contacts the cylindrical portion.

18. The vehicle wheel bearing apparatus of claim 15, wherein the outer member is formed at its either end with radially inwardly extending shoulder portions and the seals are adhered to the shoulder portions, and each inner ring is formed at its one end with axially extending cylindrical shoulder portion and the seals sliding contact the cylindrical shoulder portions.

19. The vehicle wheel bearing apparatus of claim 15, wherein the wheel hub is directly formed on its outer circumference with one of inner raceway surfaces opposing one of the outer raceway surface and the cylindrical portion extending from the inner raceway surface through a shoulder portion, and the inner ring is formed on its outer circumference with the other inner raceway surface opposing the other outer raceway surface and an end face of a smaller diameter side of the inner ring is adapted to abut against the shoulder portion.

* * * * *

UNITED STATES PATENT AND TRADEMARK OFFICE
CERTIFICATE OF CORRECTION

| | | |
|---|---|---|
| PATENT NO. | : 8,047,722 B2 | Page 1 of 1 |
| APPLICATION NO. | : 12/436205 | |
| DATED | : November 1, 2011 | |
| INVENTOR(S) | : Kazuhisa Shigeoka et al. | |

It is certified that error appears in the above-identified patent and that said Letters Patent is hereby corrected as shown below:

Column 17
Line 29, "it" should be --first--

Signed and Sealed this
Eighth Day of May, 2012

David J. Kappos
*Director of the United States Patent and Trademark Office*